UNITED STATES PATENT OFFICE.

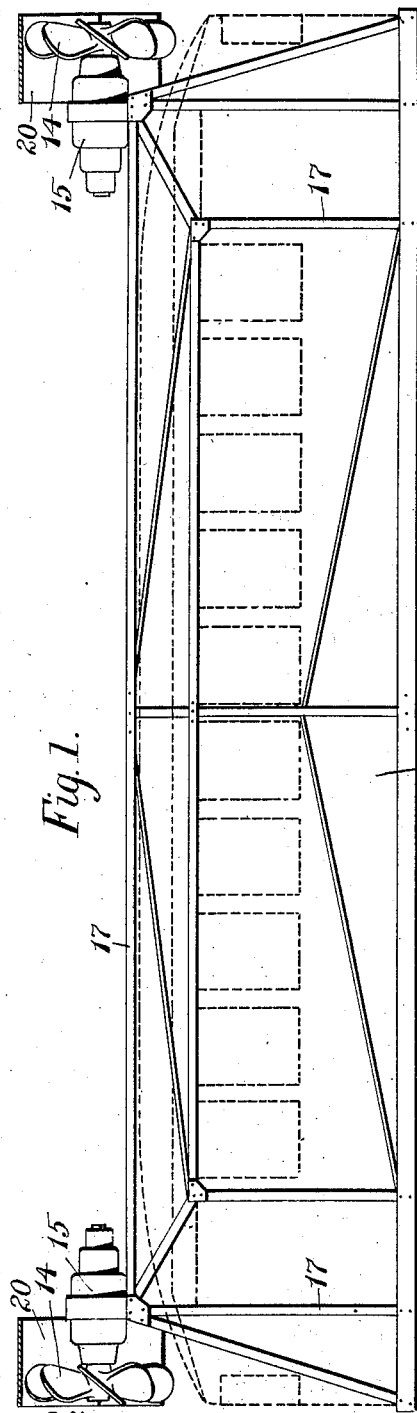
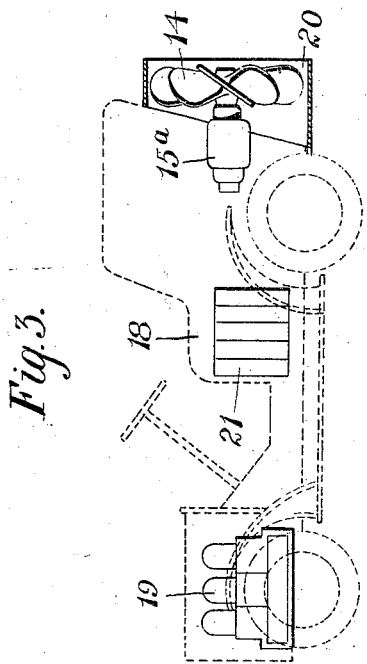
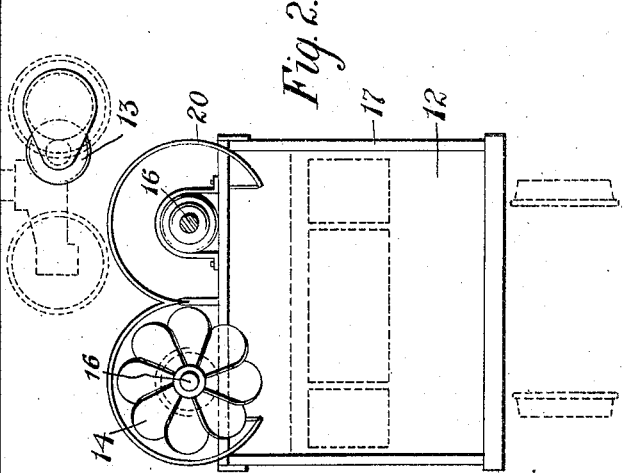

CHARLES ELKIN, OF NEW YORK, N. Y.

POWER-DRIVEN VEHICLE.

No. 906,123.     Specification of Letters Patent.     Patented Dec. 8, 1908.

Application filed November 12, 1907. Serial No. 401,806.

*To all whom it may concern:*

Be it known that I, CHARLES ELKIN, a citizen of the United States, residing at New York, in the county of New York and State of New York, have invented or discovered certain new and useful Improvements in Power-Driven Vehicles, of which the following is a specification, reference being had therein to the accompanying drawings.

This invention has for its object to provide auxiliary means whereby the speed of a motor- or power-driven vehicle may be increased or accelerated through the medium of rotating fan propellers acting on the air, and thereby augmenting the propulsion power applied to the driving wheels of the vehicles while at the same time lessening the jar or vibration of the motor-driven vehicle to which the invention may be applied. To this end the motor- or power-driven vehicle has suitably mounted thereon one or more fan propellers which are preferably electrically driven at an exceedingly high speed of rotation so that the said propellers will have approximately the amount of traction on the air that a screw propeller would have on water in driving a boat or vessel; and thus the ordinary driving mechanism of the vehicle will be assisted in propelling the same, and by this distribution of the propelling force the vehicle will be steadied in its movements and the vibrations thereof reduced. In the case of an electrically driven vehicle, auxiliary motors may be provided for driving the fan propellers, such auxiliary motors being driven by an electric current derived from the same source as that from which the current for the main motor is derived; or the fan propeller motors may be driven from power derived from storage batteries carried by the vehicles.

In order that the invention may be understood two different forms of its application or use are illustrated in the accompanying drawings, in which Figure 1 shows, in outline, an electric car having the invention applied thereto. Fig. 2 is an end elevation of the same; and Fig. 3 shows, partly in dotted outline, a motor-vehicle having the invention applied thereto.

Referring to the drawings, 12 denotes an electric car equipped with an electric motor or motors, conventionally indicated at 13, of any ordinary or suitable construction, and which motor or motors are geared to the driving wheels in any well-known manner. Preferably in the case of an electrically driven car, such as is indicated in the drawings, two fan propellers 14, driven by motors 15, mounted near the upper corners of the car, will be provided at each end thereof, and these will preferably be electrically connected in the same circuit with the motors which drive the wheels of the car, so as to be under the control of the motorman. To serve their purpose as propellers the fans 14 are, of course, all driven in the same direction, where several fans are used on one vehicle, and the said fans are freely exposed endwise to the open air so as to be effective as propellers. As the driving mechanism of the car will, as is customary, be reversible, it will be understood that the fan propellers shown will be reversed when the driving mechanism is reversed for the purpose of running the car in either direction, these propellers being started and stopped as the motor of the car is started and stopped by the motorman in the usual manner. The fan propellers 14 are carried by the motor shafts 16 in the usual or any suitable manner.

To properly sustain the weight of the fan propeller motors the car is preferably constructed with a strong metal frame-work 17 comprising suitable braces so as to give it great strength and rigidity. The fan propellers are partly inclosed by segmental guards 20 which, however, are sufficiently open to permit free movement of the air.

In the form of the invention shown in Fig. 3 the fan propeller 14 is driven by the motor 15ª suitably mounted at the rear of the car or motor vehicle 18, and which motor-vehicle is mainly driven, in the usual manner, from a motor, at 19, geared, as is customary, to the driving wheels or driving axle of the vehicle. The motor 15ª, is to be driven from a storage battery conventionally represented at 21.

The invention is not to be understood as being limited in its use to any particular form of motor or engine; the motor of the vehicle shown in Fig. 3, while preferably an internal combustion engine, may be of any approved kind, as will be understood, while the electric motor or motors of the car shown in Figs. 1 and 2 may be driven by power derived from a third rail or from an overhead or underground conductor.

Having thus described my invention I claim and desire to secure by Letters Patent:—

1. The combination, in a vehicle, with a power-driven motor or motors, of a fan propeller, or a plurality of fan propellers, serving as auxiliary drivers, exposed endwise to the open air and serving to accelerate the running speed of the vehicle as also to reduce the jar or vibration thereof by distributing the propelling force applied to the vehicle.

2. The combination, in a vehicle, with a power-driven motor or motors, of a fan propeller, or a plurality of fan propellers exposed endwise to the open air and serving as an auxiliary driving mechanism, and a source of power, independent of the vehicle driving motor or motors, for driving the said propeller or propellers, the latter serving to accelerate the running speed of the vehicle as also to reduce the jar or vibration thereof by distributing the propelling force applied to the vehicle.

3. The combination with a vehicle, of a power-driven motor or motors by which such vehicle is propelled, and fan propellers mounted at the top of said vehicle and at both ends thereof and exposed endwise to the open air, and thus serving as auxiliary drivers to accelerate the running speed of the vehicle, as also to reduce the jar or vibration thereof by distributing the propelling force applied to the vehicle.

4. The combination with a vehicle, of a power-driven motor or motors by which the said vehicle is propelled, fan propellers mounted at the top of the vehicle and exposed endwise to the open air and thus serving as auxiliary drivers to accelerate the running speed of the vehicle, as also to reduce the jar or vibration thereof by distributing the propelling force applied to the vehicle, and a braced frame work for supporting said propellers and which framework is incorporated into the construction of the body of said vehicle.

In testimony whereof I affix my signature, in presence of two witnesses.

CHARLES ELKIN.

Witnesses:
 ABRAHAM GREENBERG,
 MARY RYAN.